United States Patent
Oonuki (10) Patent No.: US 11,884,052 B2
(45) Date of Patent: Jan. 30, 2024

(54) MODULE AND METHOD OF MANUFACTURING THE SAME

(71) Applicant: AGC Automotive Window Systems Co., Ltd., Tokyo (JP)

(72) Inventor: Masahiro Oonuki, Tochigi (JP)

(73) Assignee: AGC AUTOMOTIVE WINDOW SYSTEMS CO., LTD., Tokyo (JP)

( * ) Notice: Subject to any disclaimer, the term of this patent is extended or adjusted under 35 U.S.C. 154(b) by 85 days.

(21) Appl. No.: 17/357,230

(22) Filed: Jun. 24, 2021

(65) Prior Publication Data

US 2021/0402752 A1 Dec. 30, 2021

(30) Foreign Application Priority Data

Jun. 26, 2020 (JP) ................................. 2020-110661

(51) Int. Cl.
*B32B 15/04* (2006.01)
*B32B 17/10* (2006.01)
*B32B 37/12* (2006.01)
*B32B 7/12* (2006.01)

(52) U.S. Cl.
CPC ................ *B32B 37/12* (2013.01); *B32B 7/12* (2013.01); *B32B 15/04* (2013.01); *B32B 17/10* (2013.01); *B32B 2250/02* (2013.01)

(58) Field of Classification Search
CPC ........... B32B 37/12; B32B 7/12; B32B 15/04; B32B 17/10; B32B 2250/02; C09J 2203/354; C09J 2400/146; C09J 5/04; F16B 11/006
See application file for complete search history.

(56) References Cited

U.S. PATENT DOCUMENTS

| 9,446,569 | B2 * | 9/2016 | Lee ...................... B32B 38/1866 |
| 2006/0141247 | A1 * | 6/2006 | Bohm ........................ C09J 7/29 428/355 R |
| 2013/0206335 | A1 * | 8/2013 | Renius .................. F16B 11/006 156/305 |

FOREIGN PATENT DOCUMENTS

JP 2005-146035 A 6/2005

* cited by examiner

Primary Examiner — Humera N. Sheikh
Assistant Examiner — Kevin CT Li
(74) Attorney, Agent, or Firm — Panitch Schwarze Belisario & Nadel LLP (57) ABSTRACT

A module includes a first member with a first surface, a second member with a second surface opposed to the first surface, a first bonding agent, and a second bonding agent. The first bonding agent is provided in a first region on the second surface, and bonds the second member to the first surface with first bonding strength allowing the second member to be retained on the first surface. The second bonding agent is provided in a second region on the second surface, and bonds the second member to the first surface with second bonding strength allowing the second member to be retained on the first surface. Second curing time taken before the second bonding agent exhibits the second bonding strength by curing in a predetermined atmosphere is shorter than first curing time taken before the first bonding agent exhibits the first bonding strength by curing in the predetermined atmosphere.

6 Claims, 10 Drawing Sheets

MODULE AND METHOD OF MANUFACTURING THE SAME

CROSS REFERENCE TO RELATED APPLICATIONS

This application claims the benefit of Japanese Priority Patent Application No. 2020-110661 filed on Jun. 26, 2020, the entire contents of which are incorporated herein by reference.

BACKGROUND

The technology relates to a module including a first member and a second member bonded to the first member, and to a method of manufacturing the same.

There has been proposed an adhesion method of adhering a second adherend to a first adherend via an adhesive, and thereafter curing the adhesive without fixing the second adherend to the first adherend. Examples of the first adherend include automotive glass. For example, reference is made to Japanese Unexamined Patent Application Publication No. 2005-146035.

SUMMARY

A module according to one example embodiment of the disclosure includes a first member, a second member, a first bonding agent, and a second bonding agent. The first member has a first surface. The second member has a second surface opposed to the first surface. The first bonding agent is provided in a first region on the second surface, and bonds the second member to the first surface with first bonding strength that allows the second member to be retained on the first surface. The second bonding agent is provided in a second region on the second surface, and bonds the second member to the first surface with second bonding strength that allows the second member to be retained on the first surface. Second curing time taken before the second bonding agent exhibits the second bonding strength by being cured in a predetermined atmosphere is shorter than first curing time taken before the first bonding agent exhibits the first bonding strength by being cured in the predetermined atmosphere.

A method of manufacturing a module according to one example embodiment of the disclosure includes: preparing a first member having a first surface; preparing a second member having a second surface; providing a first bonding agent in a first region on the second surface; providing a second bonding agent in a second region on the second surface; and bonding together the first member and the second member to sandwich the first bonding agent and the second bonding agent between the first surface and the second surface. The first bonding agent is configured to bond the second member to the first surface with first bonding strength and take first curing time before exhibiting the first bonding strength by being cured in a predetermined atmosphere. The first bonding strength allows the second member to be retained on the first surface. The second bonding agent is configured to bond the second member to the first surface with second bonding strength and take second curing time before exhibiting the second bonding strength by being cured in the predetermined atmosphere. The second bonding strength allows the second member to be retained on the first surface. The second curing time is shorter than the first curing time.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In a case of bonding two members together by adhesion, for example, it is desired that the two members be bonded together in a shorter length of time.

It is desirable to provide a module and a method of manufacturing the same that enable more efficient bonding with higher accuracy.

Some example embodiments of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description is given in the following order.

1. First Example Embodiment

An example of a glass module in which a first member and a second member are bonded together by a first bonding agent and a second bonding agent, and squeeze-out of the second bonding agent is suppressed by providing the second member with a groove.

2. Modification Examples of First Example Embodiment
3. Second Example Embodiment An example of the glass module in which the first member and a second member are bonded together by the first bonding agent and the second bonding agent, and squeeze-out of the second bonding agent is suppressed by providing the second member with a pair of walls.

4. Modification Example of Second Example Embodiment
5. Experimental Examples
6. Other Modification Examples

1. FIRST EXAMPLE EMBODIMENT

[Outline Configuration of Glass Module 1]

Figure 1:
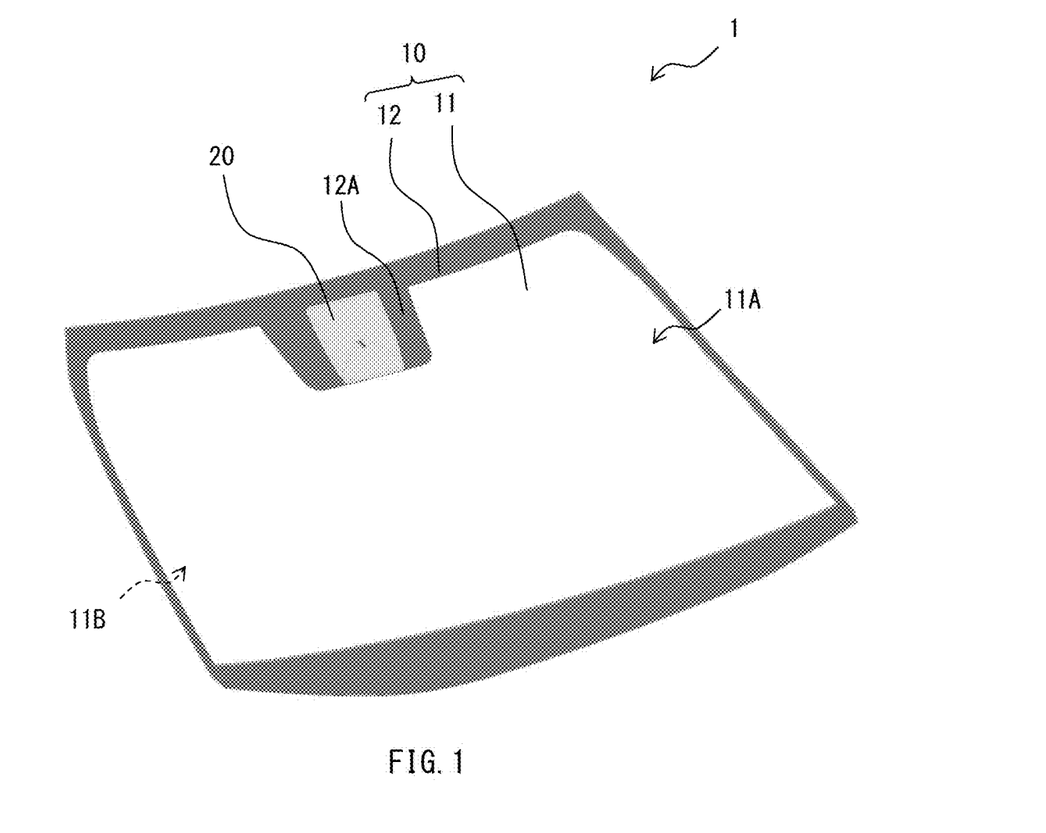
FIG. 1 is a perspective view of an example overall configuration of a glass module according to one example embodiment.

FIG. 1 is a perspective view of an example overall configuration of a glass module 1 serving as a module according to a first example embodiment of the technology. The glass module 1 includes, for example, a glass member 10 and a bracket 20. The glass member 10 may serve as a front windshield to be attached to a front window frame of a body of a vehicle. The bracket 20 may be bonded to an upper middle part of a surface, of the glass member 10, facing a vehicle compartment of the vehicle. The glass member 10 and the bracket 20 are bonded to each other by two types of bonding agents with different properties, e.g., a first bonding agent 30 and a second bonding agent 40.

In one embodiment, the glass member 10 corresponds to a specific but non-limiting example of a "first member". In one embodiment, the bracket 20 corresponds to a specific but non-limiting example of a "second member".

Note that the term "bonding" used herein may refer to an inclusive concept encompassing both "adhesion" and "pressure-sensitive adhesion", and the term "bonding agent" used herein may refer to an inclusive concept encompassing both an "adhesive" and a "pressure-sensitive adhesive".

[Glass Member 10]

The glass member 10 may be a member mainly containing glass. The glass member 10 may include a transparent glass part 11 and a black part 12. The glass part 11 may transmit at least visible light. The black part 12 may be provided in the periphery of an inner surface 11A of the glass part 11. An upper middle part of the black part 12 may serve as an expanded region 12A expanded downward along the glass part 11. Of the glass part 11, a surface facing the vehicle compartment of the vehicle is referred to as the inner surface 11A, and a surface facing the outside of the vehicle is referred to as an outer surface 11B. The glass part 11 may be, for example, laminated glass including laminated two or more pieces of sheet glass. The laminated glass may include an intermediate film, such as a transparent resin film, interposed between the pieces of sheet glass. The black part 12 may have, for example, black ceramic containing an oxide of bismuth (Bi) printed thereon. The black part 12 may suppress transmission of ultraviolet light.

In one embodiment, the inner surface 11A corresponds to a specific but non-limiting example of a "first surface".

[Bracket 20]

Figure 2A:
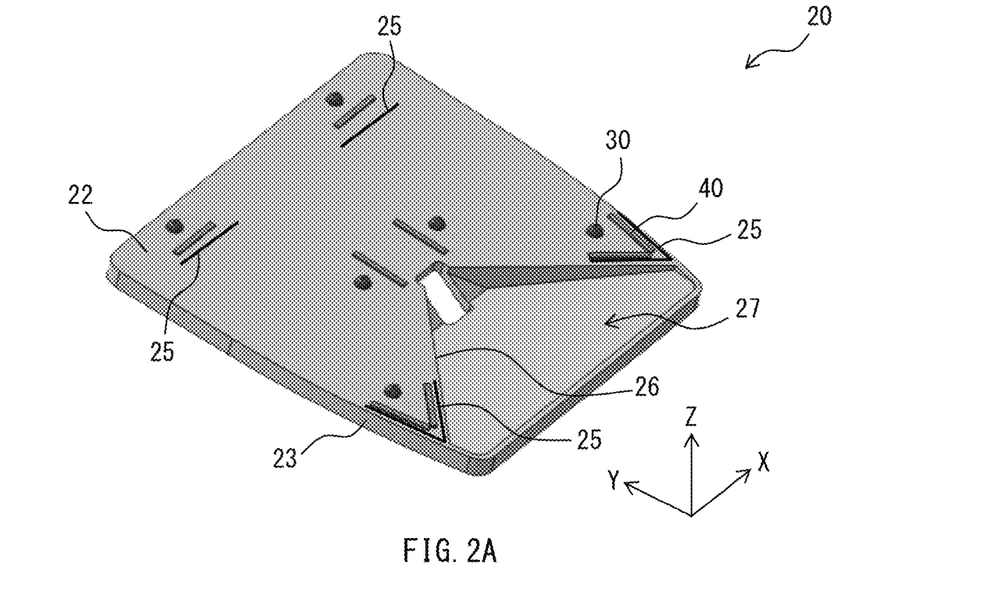
FIG. 2A is a perspective view of an example overall configuration of a bracket illustrated in FIG. 1.
Figure 2B:
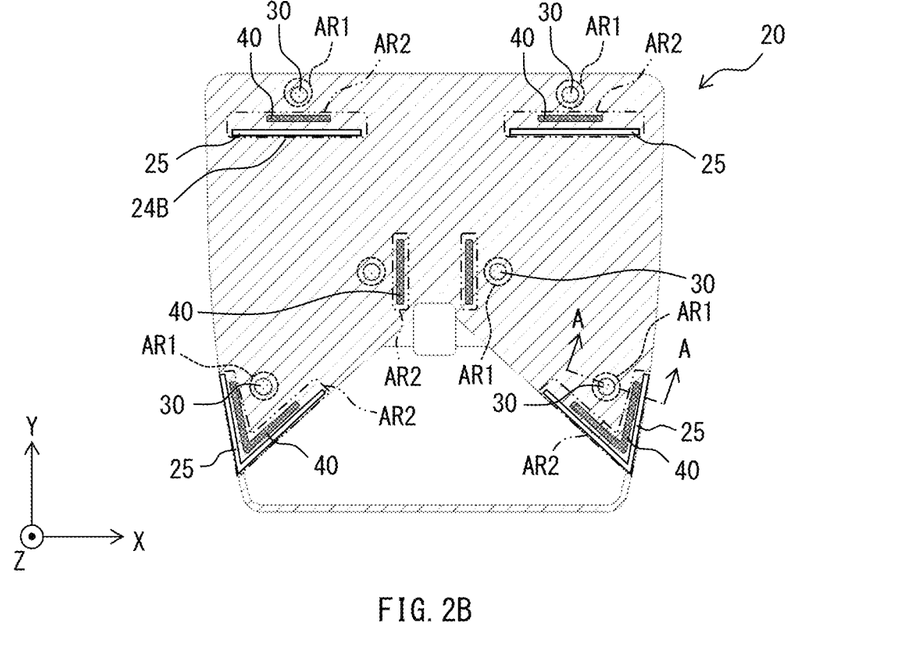
FIG. 2B is a plan view of the example overall configuration of the bracket illustrated in FIG. 1.
Figure 3A:
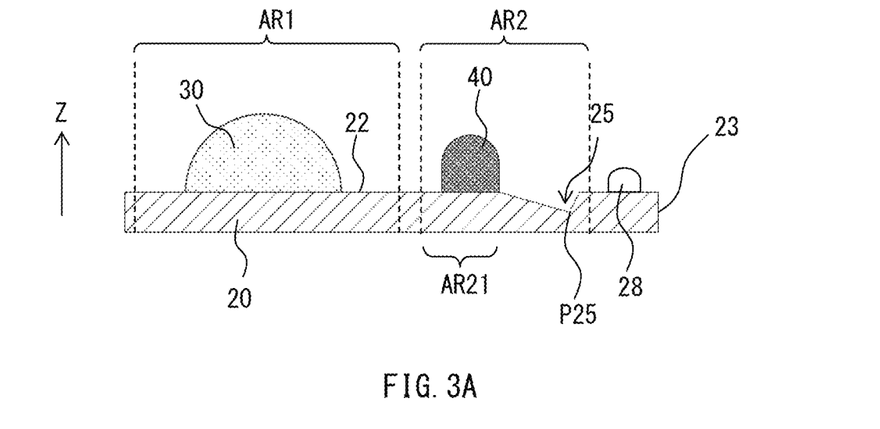
FIG. 3A is a partial cross-sectional view of an example partial configuration of the bracket, of the glass module illustrated in FIG. 1, in a state before being joined to a glass member.
Figure 3B:
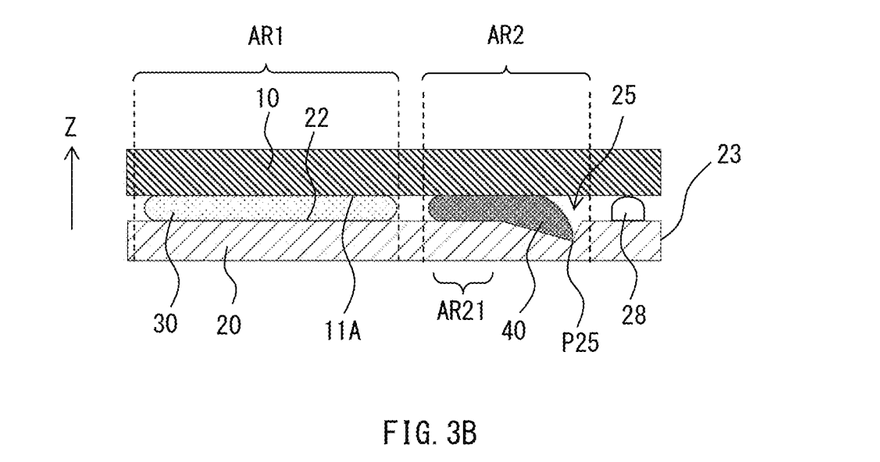
FIG. 3B is a cross-sectional view of an example partial configuration of the glass module illustrated in FIG. 1.

The bracket 20 may be attached to the expanded region 12A of the black part 12 on the inner surface 11A of the glass part 11. FIG. 2A and FIG. 2B are, respectively, a perspective view and a plan view of an example overall configuration of the bracket 20. FIG. 3A and FIG. 3B are each a partial cross-sectional view of a cross section in an arrow direction taken along line A-A illustrated in FIG. 2B. Note that FIG. 2B and FIG. 3A each illustrate a state of the bracket 20 at a stage before being bonded to the glass member 10. In contrast, FIG. 3B illustrates a state in which the glass member 10 and the bracket 20 have been joined together by the first bonding agent 30 and the second bonding agent 40. The bracket 20 may be, for example, a camera bracket for mounting of a camera on the glass member 10. The camera may capture an image ahead of the vehicle. The bracket 20 may be, for example, a resin member mainly containing a plastic material, such as ABS resin or polycarbonate. The bracket 20 may be a metallic member mainly containing a metal, such as stainless steel. Alternatively, the bracket 20 may be a combination of a resin member and a metallic member. The bracket 20 may be a plate-shaped member having a surface 22 and an outer edge 23. The bracket 20 may further be provided with a recess 27 having an outline defined by an inner edge 26. In one embodiment, the surface 22 corresponds to a specific but non-limiting example of a "second surface".

As illustrated in FIG. 2B, the surface 22 of the bracket 20 may be provided with a plurality of first regions AR1 to be coated with the first bonding agent 30 and a plurality of second regions AR2 to be coated with the second bonding agent 40. Note that FIG. 2A does not illustrate the first regions AR1 and the second regions AR2. In FIG. 2B, the first regions AR1 may be substantially circular regions surrounded by dashed lines on the surface 22, and the second regions AR2 may be substantially quadrangular and substantially V-shaped regions surrounded by dashed and double-dotted lines on the surface 22. Although six first regions AR1 and six second regions AR2 are provided in FIG. 2B, the first regions AR1 and the second regions AR2 may be arranged in any arrangement, without being limited in number, position, and shape to the arrangement illustrated in FIG. 2B.

As illustrated in FIG. 2B, some of the second regions AR2 on the surface 22 of the bracket 20 may be provided with respective grooves 25. As illustrated in FIG. 3A, each of the grooves 25 may extend along the outer edge 23 or the inner edge 26. The groove 25 may have, for example, a depth that increases with increasing proximity to the outer edge 23. For example, as illustrated in FIG. 3A, the groove 25 may have a deepest part P25 that is located closer to the outer edge 23 or the inner edge 26 than a middle position in a width direction of the groove 25 is, in a cross section orthogonal to an extending direction of the groove 25. The groove 25 may, for example, serve as a buffer part in joining together the glass member 10 and the bracket 20 in a manufacturing process of the glass module 1. As illustrated in FIG. 3B, the buffer part may store the second bonding agent 40 that partly flows therein by being squeezed between the inner surface 11A of the glass part 11 and the surface 22 of the bracket 20. Accordingly, at the stage before the glass member 10 and the bracket 20 are bonded together, the second bonding agent 40 may be provided at a position other than the groove 25 on the second region AR2, as illustrated in FIG. 3A. For example, the second bonding agent 40 may be provided in an inner region AR21, of the second region AR2, on a side opposite to the outer edge 23 or the inner edge 26 with respect to the groove 25, as illustrated in FIG. 3A. One reason for this is to effectively prevent the squeezed second bonding agent 40 from partly being squeezed out of the bracket 20 from the outer edge 23 or the inner edge 26. In one embodiment, the groove 25 corresponds to a specific but non-limiting example of a "first groove". The bracket 20 may further include one or more projections 28 in any place on the surface 22. The projection 28 may serve as a spacer that defines a distance between the inner surface 11A of the glass part 11 and the surface 22 of the bracket 20.

[First Bonding Agent 30]

The first bonding agent 30 may be an adhesive that is provided in the first regions AR1 on the surface 22 of the bracket 20, and bonds the bracket 20 to the inner surface 11A with first bonding strength F1, e.g., 2 MPa or greater. The first bonding strength F1 allows the bracket 20 to be retained on the inner surface 11A. The first bonding agent 30 takes first curing time TA1 before exhibiting the first bonding strength F1 by being cured in a predetermined atmosphere, e.g., in air at room temperature (about 25° C.). The first curing time TA1 may be, for example, about 168 hours. A first retaining period TB1 during which the first bonding agent 30 is able to retain the bracket 20 on the inner surface 11A may be a long term of, for example, several years to over ten years. Note that the first retaining period TB1 refers to a period during which, under a normal usage environment, the first bonding agent 30 is able to keep a bonded state in which the bracket 20 is bonded to the inner surface 11A. Moreover, the first bonding agent 30 may have, for example, chemical resistance and thermal resistance respectively higher than chemical resistance and thermal resistance of the second bonding agent 40. The first bonding strength F1 may be, for example, higher than second bonding strength F2 to be described later. Examples of the first bonding agent 30 described above may include an adhesive including at least one of epoxy resin, polyurethane resin, acrylic resin, or modified silicone resin.

[Second Bonding Agent 40]

The second bonding agent 40 may be an adhesive or pressure-sensitive adhesive that is provided in the second regions AR2 on the surface 22 of the bracket 20, and bonds the bracket 20 to the inner surface 11A with the second bonding strength F2. The second bonding strength F2 allows the bracket 20 to be retained on the inner surface 11A. As described above, the first bonding strength F1 of the first bonding agent 30 may be higher than the second bonding strength F2 of the second bonding agent 40. The second bonding agent 40 may be, for example, a pressure-sensitive adhesive including at least one of synthetic rubber or acrylic, or an adhesive including polyolefin. The second bonding agent 40 takes second curing time TA2 before exhibiting the second bonding strength F2 by being cured in a predetermined atmosphere, e.g., in air at room temperature (about 25° C.). The second curing time TA2 is shorter than the first curing time TA1. The second curing time TA2 may be, for example, about several seconds or less. A second retaining period TB2 during which the second bonding agent 40 is able to retain the bracket 20 on the inner surface 11A may be shorter than the first retaining period TB1 for the first bonding agent 30. Note that the second retaining period TB2 refers to a period during which, under a normal usage environment, the second bonding agent 40 is able to keep a bonded state in which the bracket 20 is bonded to the inner surface 11A.

[Method of Manufacturing Glass Module 1]

Figure 4:
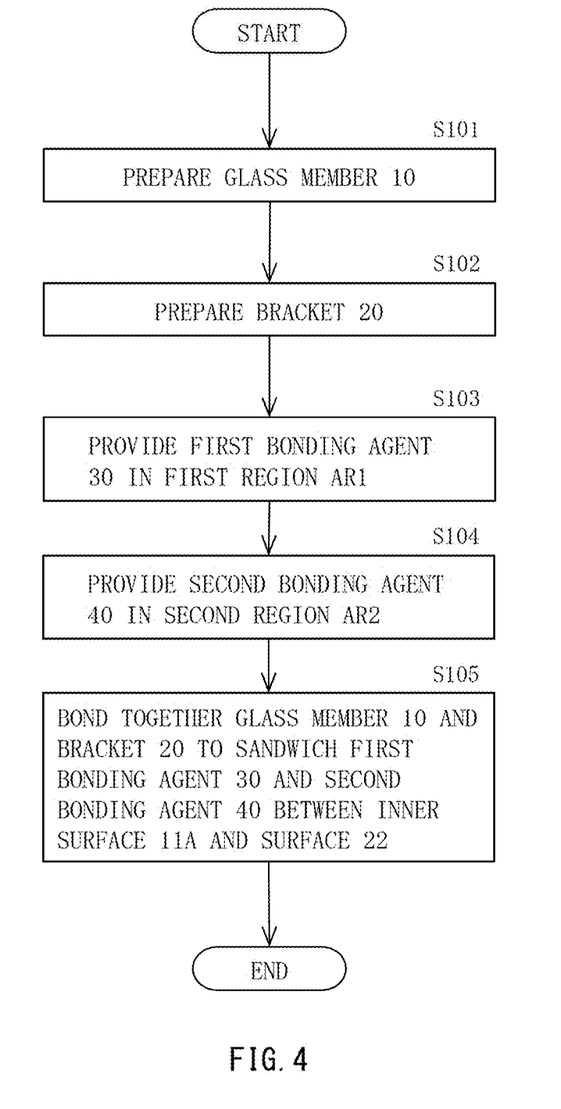
FIG. 4 is a flowchart illustrating a method of manufacturing the glass module illustrated in FIG. 1.

A method of manufacturing the glass module 1 will now be described, with reference to a flowchart illustrated in FIG. 4.

First, the glass member 10 provided with the black part 12 on the inner surface 11A of the glass part 11 is prepared (step S101). Next, the bracket 20 having the surface 22 is prepared (step S102). Next, the first bonding agent 30 is provided in the first regions AR1 on the surface 22 (step S103), and the second bonding agent 40 is provided in the second regions AR2 on the surface 22 (step S104). The first bonding agent 30 and the second bonding agent 40 may be jetted to desired regions by, for example, using a heating dispenser. In the jetting, heat may be applied as appropriate to adjust viscosity. Next, the bracket 20 may be opposed to the expanded region 12A of the inner surface 11A. Thereafter, the glass member 10 and the bracket 20 are bonded together to sandwich the first bonding agent 30 and the second bonding agent 40 between the inner surface 11A and the surface 22 (step S105). The manufacture of the glass module 1 may be completed through the above steps (end). As described above, a bonding agent configured to bond the bracket 20 to the inner surface 11A with the first bonding strength F1 and take the first curing time TA1 before exhibiting the first bonding strength F1 by being cured in a predetermined atmosphere is used as the first bonding agent 30. The first bonding strength F1 allows the bracket 20 to be retained on the inner surface 11A. A bonding agent configured to bond the bracket 20 to the inner surface 11A with the second bonding strength F2 and take the second curing time TA2 before exhibiting the second bonding strength F2 by being cured in a predetermined atmosphere is used as the second bonding agent 40. The second bonding strength F2 allows the bracket 20 to be retained on the inner surface 11A. As described above, the second curing time TA2 may be, for example, about several seconds or less.

[Example Workings and Effects of Glass Module 1]

As described above, in the glass module 1 according to the example embodiment, the glass member 10 and the bracket 20 are bonded together by using two types of bonding agents with different curing times, e.g., the first bonding agent 30 and the second bonding agent 40. This makes it possible to shorten a period before shipping, after manufacture, without impairing accuracy of a relative position between the glass member 10 and the bracket 20. For example, even in a period before the first bonding agent 30 exhibits the first bonding strength F1, i.e., a period before elapse of the first curing time TA1, the bracket 20 may be kept bonded to the glass member 10 by the second bonding agent 40 that exhibits the second bonding strength F2 in the second curing time TA2 shorter than the first curing time TA1. After elapse of the first curing time TA1, the bracket 20 may be substantially permanently kept bonded to the glass member 10 by the first bonding agent 30 with high bonding strength. Consequently, the glass module 1 according to the example embodiment enables transportation and shipping before elapse of the first curing time TA1, as compared with a case where, for example, the glass member 10 and the bracket 20 are joined together by using only the first bonding agent 30. This makes it possible to reduce, for example, a storage period and storage facilities. For example, an adhesive having the first retaining period TB1 longer than the second retaining period TB2 of the second bonding agent 40 and having the chemical resistance and the thermal resistance respectively higher than the chemical resistance and the thermal resistance of the second bonding agent 40 may be used as the first bonding agent 30. This makes it possible to further improve long-term reliability. As described above, the glass module 1 according to the example embodiment makes it possible to improve production efficiency in the whole manufacturing process, while ensuring reliability in terms of quality.

According to the example embodiment, even if a region to be coated with the second bonding agent 40 has a complicated shape, it is possible to perform an operation of applying the second bonding agent 40 easily, as compared with a case where, for example, a double-sided tape is used in place of the second bonding agent 40. Moreover, although operation is difficult to mechanize and necessitates manual operation in a case where a double-sided tape is used, the operation of applying the second bonding agent 40 is easy to automize by mechanization.

In some embodiments, the groove 25 may be provided in the second region AR2 of the surface 22. Thus, in joining together the glass member 10 and the bracket 20, the second bonding agent 40 squeezed between the inner surface 11A and the surface 22 partly flows into the groove 25 to be stored, and the second bonding agent 40 spreads along the extending direction of the groove 25. This makes it possible to suppress spread of the second bonding agent 40 in the width direction of the groove 25. Thus, it is possible to prevent the second bonding agent 40 from being squeezed out of the bracket 20 from the outer edge 23. It is also possible to prevent the second bonding agent 40 from coming into contact with the first bonding agent 30. Moreover, spread of the second bonding agent 40 in the second region AR2 results in an increase in an area of the bracket 20 contacted by the second bonding agent 40, which improves bonding strength.

In some embodiments, providing the groove 25 makes it possible to clarify a position to be coated with the second bonding agent 40 on the surface 22. This makes it possible to prevent, in the operation of applying the second bonding agent 40, the second bonding agent 40 from being applied at a wrong position.

2. MODIFICATION EXAMPLES OF FIRST EXAMPLE EMBODIMENT

First Modification Example

Figure 5A:
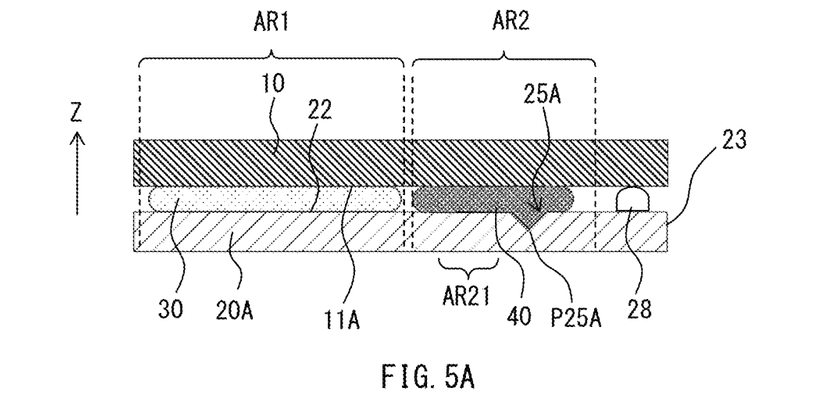
FIG. 5A is a partial cross-sectional view of a cross-sectional shape of a bracket according to a first modification example.

FIG. 5A illustrates a shape of a groove 25A in a bracket 20A according to a first modification example. The groove 25A may have a deepest part P25A located at substantially a middle position in a width direction of the groove 25A, in a cross section orthogonal to an extending direction of the groove 25A.

Second Modification Example

Figure 5B:
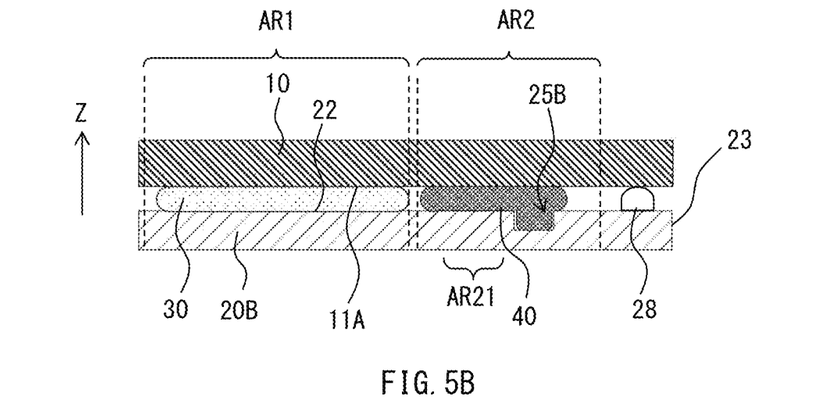
FIG. 5B is a partial cross-sectional view of a cross-sectional shape of a bracket according to a second modification example.

FIG. 5B illustrates a shape of a groove 25B in a bracket 20B according to a second modification example. The groove 25B may have a substantially rectangular shape in a cross section orthogonal to an extending direction of the groove 25B. The bracket 20B with the groove 25B according to the second modification example makes it possible to narrow a width of the second bonding agent 40 that contacts the inner surface 11A, as compared with the bracket 20A with the groove 25A according to the first modification example, if the groove 25A and the groove 25B have the same depth as each other.

Third Modification Example

Figure 5C:
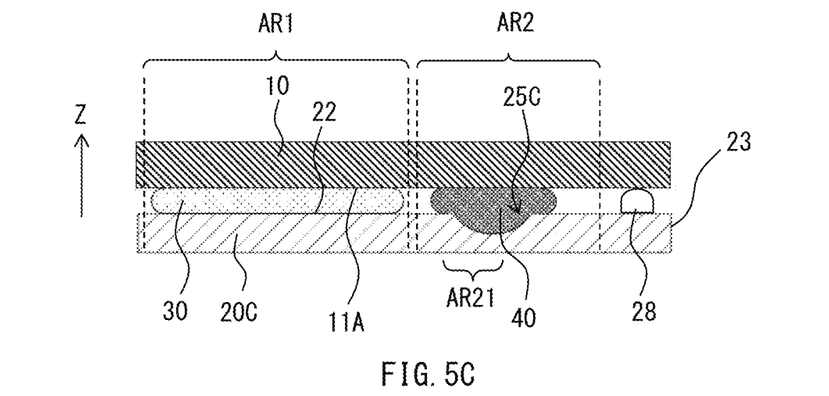
FIG. 5C is a partial cross-sectional view of a cross-sectional shape of a bracket according to a third modification example.

FIG. 5C illustrates a shape of a groove 25C in a bracket 20C according to a third modification example. The groove 25C may have a curved shape in a cross section orthogonal to an extending direction of the groove 25C. The bracket 20C according to the third modification example enables the second bonding agent 40 to be applied to the groove 25C to spread more evenly to right and left in a width direction of the groove 25C, as compared with the bracket 20A with the groove 25A according to the first modification example. This makes it possible to accurately control a region to which the second bonding agent 40 spreads from the groove 25C.

Fourth Modification Example

Figure 6A:
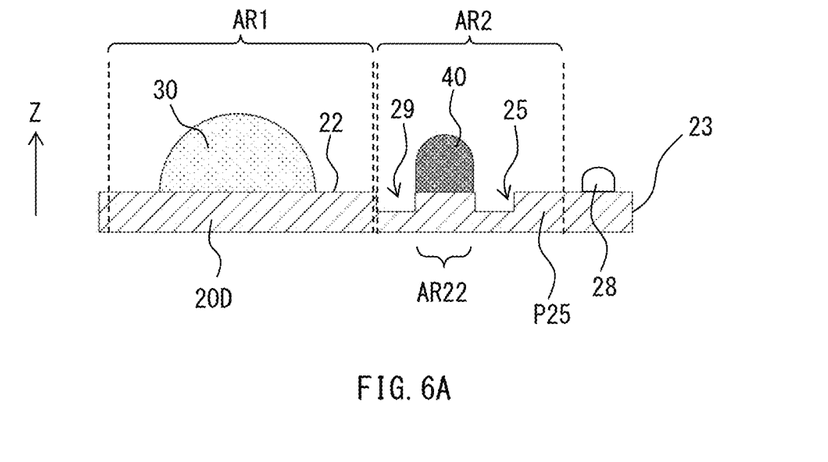
FIG. 6A is a partial cross-sectional view of an example partial configuration of a bracket according to a fourth modification example in a state before being joined to the glass member.
Figure 6B:
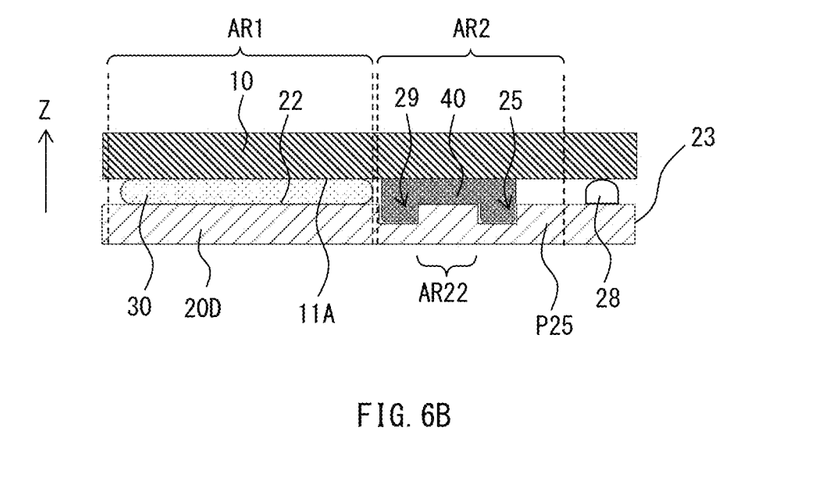
FIG. 6B is a partial cross-sectional view of an example partial configuration of the bracket according to the fourth modification example in a state of having been joined to the glass member.

FIG. 6A and FIG. 6B illustrate a cross-sectional shape of a bracket 20D according to a fourth modification example. FIG. 6A and FIG. 6B are, respectively, partial cross-sectional views corresponding to FIG. 3A and FIG. 3B. Note that FIG. 6A illustrates a state of the bracket 20D at a stage before being bonded to the glass member 10. In contrast, FIG. 6B illustrates a state in which the glass member 10 and the bracket 20D have been joined together by the first bonding agent 30 and the second bonding agent 40.

As illustrated in FIG. 6A and FIG. 6B, the surface 22 of the bracket 20D may further have a groove 29 provided between the first region AR1 provided with the first bonding agent 30 and the second region AR2 provided with the second bonding agent 40. The groove 29 may extend along the groove 25, for example. The groove 29 may have a depth, a cross-sectional shape, and a planar shape substantially matching, respectively, a depth, a cross-sectional shape, and a planar shape of the groove 25. Alternatively, all or a part of the depth, the cross-sectional shape, and the planar shape may be different between the groove 25 and the groove 29. In one embodiment, the groove 29 corresponds to a specific but non-limiting example of a "second groove".

The groove 29 may, for example, serve as a buffer part in joining together the glass member 10 and the bracket 20D in the manufacturing process of the glass module 1, as with the groove 25. As illustrated in FIG. 6B, the buffer part may store the second bonding agent 40 that partly flows therein by being squeezed between the inner surface 11A of the glass part 11 and the surface 22 of the bracket 20D. Accordingly, at the stage before the glass member 10 and the bracket 20D are bonded together, the second bonding agent 40 may be provided in an intermediate region AR22, of the second region AR2, located between the groove 25 and the groove 29, as illustrated in FIG. 6A. The groove 25 may receive a portion of the squeezed second bonding agent 40, which makes it possible to effectively prevent the second bonding agent 40 from being squeezed out of the bracket 20 from the outer edge 23 or the inner edge 26. Moreover, the groove 29 may receive another portion of the squeezed second bonding agent 40, which makes it possible to prevent the second bonding agent 40 from contacting and being mixed with the first bonding agent 30. Consequently, it is possible to appropriately maintain the first bonding strength F1, the second bonding strength F2, the first curing time TA1, and the second curing time TA2, for example, which helps to ensure long-term reliability.

3. SECOND EXAMPLE EMBODIMENT

[Outline Configuration of Bracket 20E]

Figure 7A:
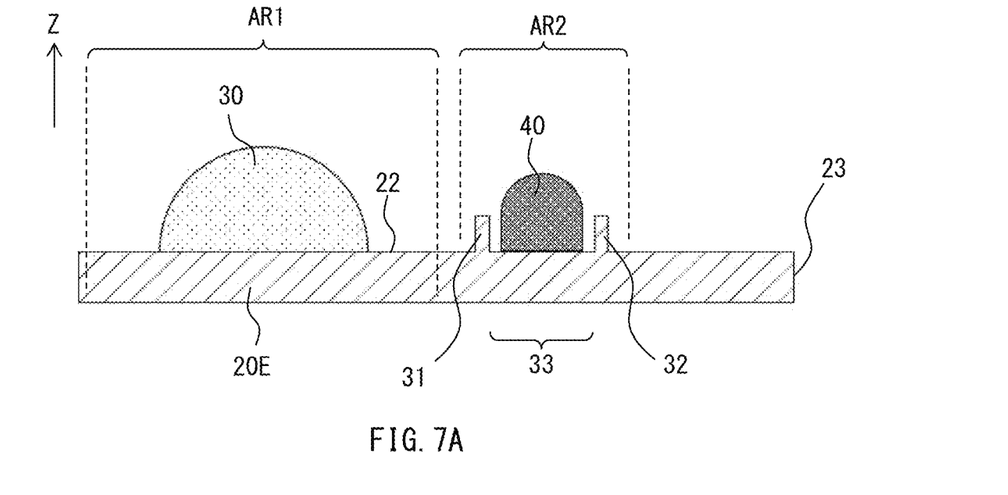
FIG. 7A is a partial cross-sectional view of an example partial configuration of a bracket according to one example embodiment in a state before being joined to the glass member.
Figure 7B:
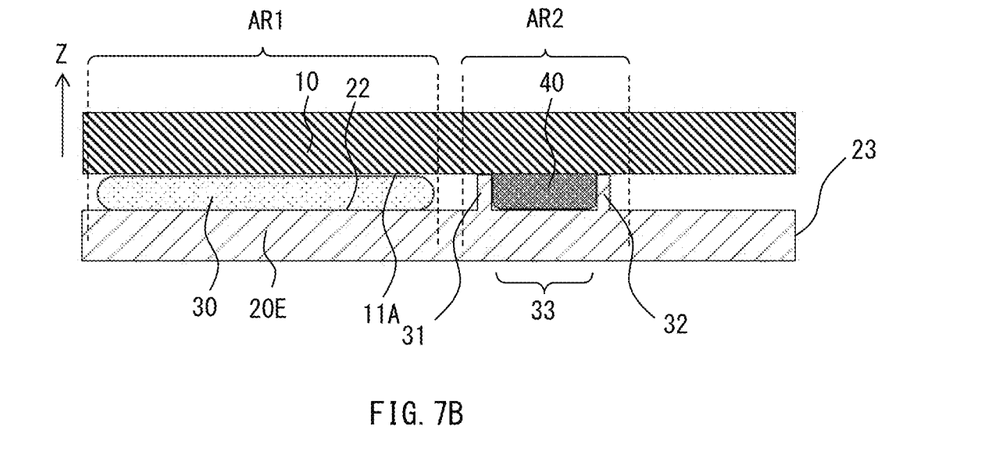
FIG. 7B is a partial cross-sectional view of an example partial configuration of the bracket according to one example embodiment in a state of having been joined to the glass member.

FIG. 7A and FIG. 7B illustrate a cross-sectional shape of a bracket 20E according to a second example embodiment of the technology. FIG. 7A and FIG. 7B are, respectively, partial cross-sectional views corresponding to FIG. 3A and FIG. 3B described in the first example embodiment. Note that FIG. 7A illustrates a state of the bracket 20E at a stage before being bonded to the glass member 10. In contrast, FIG. 7B illustrates a state in which the glass member 10 and the bracket 20E have been joined together by the first bonding agent 30 and the second bonding agent 40.

The second region AR2 on the bracket 20E may be provided with a pair of walls 31 and 32 standing on the surface 22 and opposed to each other. The pair of walls 31 and 32 may each extend along the outer edge 23 or the inner edge 26. The second bonding agent 40 may be provided in a receiving part 33 between the wall 31 and the wall 32. The wall 31 and the wall 32 may, for example, have the same height in a Z-axis direction. Note that the wall 31 may have a width and a height respectively different from a width and a height of the wall 32.

Example Workings and Effects of Bracket 20E

In the example embodiment, the glass module 1 may include the bracket 20E having the pair of walls 31 and 32, and the second bonding agent 40 may be provided between the wall 31 and the wall 32. Thus, in joining together the glass member 10 and the bracket 20E, it is possible to prevent the second bonding agent 40 squeezed between the inner surface 11A and the surface 22 from being squeezed out of the bracket 20E from the outer edge 23 or the inner edge 26. For example, the wall 31, the wall 32, or both may be made to have a predetermined height, which makes it possible to appropriately maintain a distance between the inner surface 11A of the glass part 11 and the surface 22 of the bracket 20E. In that case, it may be unnecessary to provide the projection 28 described in the first example embodiment. Moreover, the wall 31 and the wall 32 may have the same height as each other. This enables the wall 31 and the wall 32 to stably define, as spacers, the distance between the inner surface 11A of the glass part 11 and the surface 22 of the bracket 20E, and also to effectively suppress squeeze-out of the second bonding agent 40.

Moreover, providing the walls 31 and 32 makes it possible to improve mechanical strength of the bracket 20E, as compared with a case where the groove 25 recessed from the surface 22 is provided as in the first example embodiment.

Providing the walls 31 and 32 makes it possible to suppress spread of the second bonding agent 40 in an in-plane direction, making the second bonding agent 40 thicker, as compared with a case where the groove 25 recessed from the surface 22 is provided as in the first example embodiment. In a case of the first example embodiment, if the second bonding agent 40 that decreases in viscosity under a high-temperature environment is used, for example, it is expected to be difficult to make the second bonding agent 40 itself thick enough, because the second bonding agent 40 spreads in the in-plane direction immediately after being applied to the second region AR2.

Providing the walls 31 and 32 makes it easier to have a stable feeling of resistance in pressing and joining the bracket 20 to the glass member 10, as compared with the first example embodiment. In the first example embodiment, the inner surface 11A of the glass member 10 and the surface 22 of the bracket 20 do not directly contact each other, and the second bonding agent 40 applied to the second region AR2 of the surface 22 spreads in the in-plane direction by being pressed. Thus, it is difficult to give a feeling of resistance to a hand of an operator performing the joining, for example. In contrast, in the example embodiment, upper ends of the walls 31 and 32 contact the glass member 10, and the second bonding agent 40 does not spread beyond a distance between the wall 31 and the wall 32. Thus, in pressing the bracket 20 against the glass member 10, it is easy to give a predetermined feeling of resistance to the hand of the operator performing the joining. This makes it easier to press the bracket 20 against the glass member 10 with force kept within a predetermined range, which enables a stable joining operation. This helps to further improve long-term reliability of the glass module 1.

4. MODIFICATION EXAMPLE OF SECOND EXAMPLE EMBODIMENT

Figure 7C:
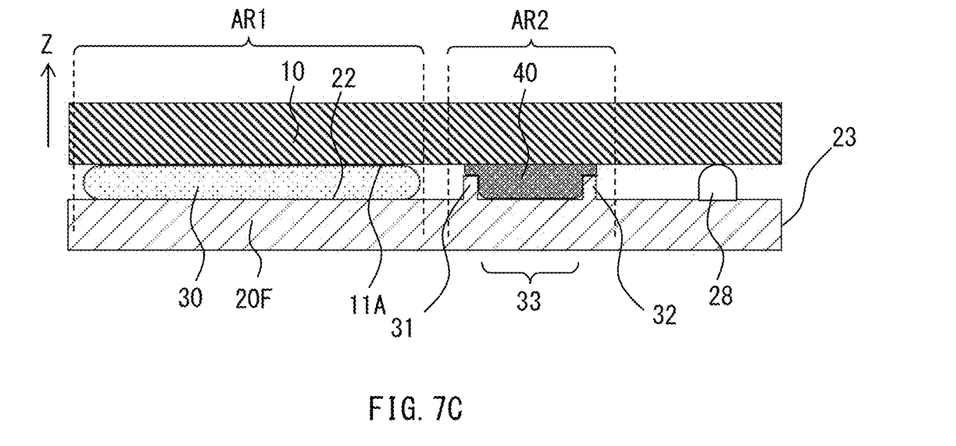
FIG. 7C is a partial cross-sectional view of a cross-sectional shape of a bracket according to a fifth modification example.

In the example embodiment, for example, the projection 28 serving as a spacer may be provided in any place on the surface 22, in addition to the wall 31 and the wall 32, as with a bracket 20F according to a fifth modification example illustrated in FIG. 7C. In that case, the heights of the wall 31 and the wall 32 may be set to any heights.

5. EXPERIMENTAL EXAMPLES

Figure 8A:
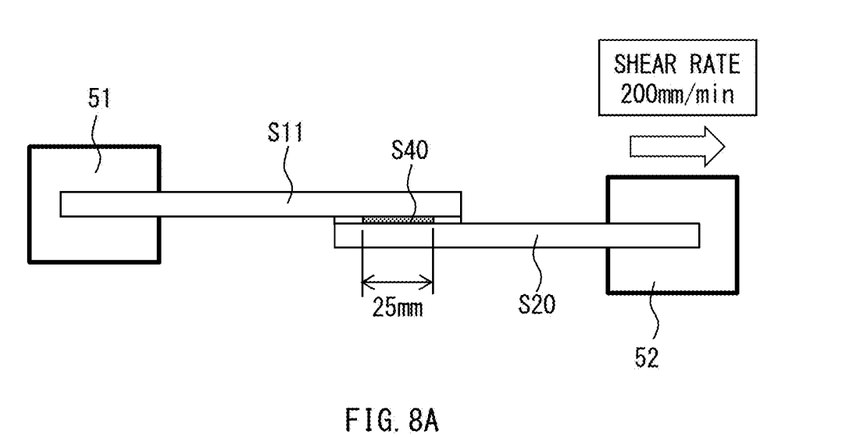
FIG. 8A is a first schematic diagram illustrating a state of a shear adhesion strength test.
Figure 8B:
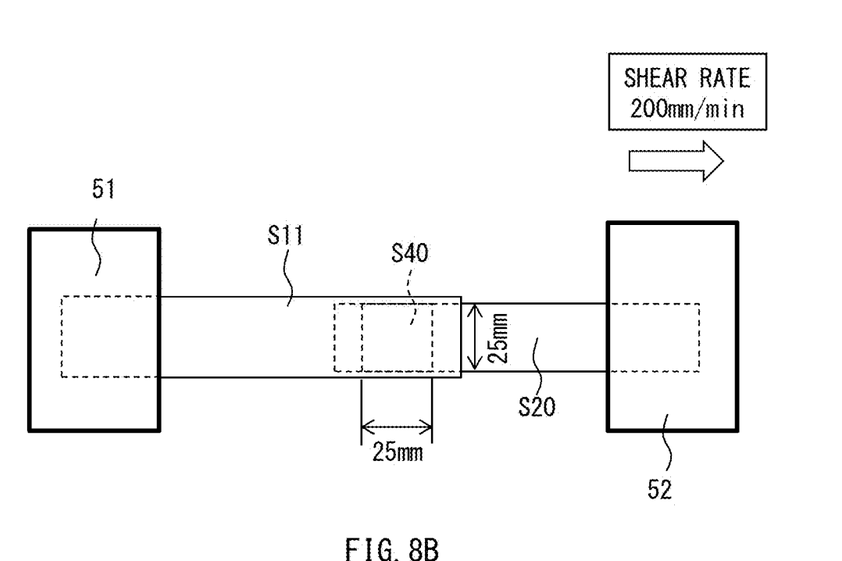
FIG. 8B is a second schematic diagram illustrating the state of the shear adhesion strength test.

Adhesives and pressure-sensitive adhesives applicable as the first bonding agent and the second bonding agent according to at least one embodiment of the technology were evaluated in terms of bonding strength. As illustrated in FIG. 8A and FIG. 8B, samples each including a glass plate S11 and a plastic plate S20 opposed to each other and bonded together to sandwich a bonding agent S40 were prepared. The glass plate S11 contained glass serving as a constituent material of the glass member. The plastic plate S20 contained polycarbonate and ABS serving as constituent materials of the bracket. Thereafter, the samples were subjected to a shear adhesion strength test. FIG. 8A and FIG. 8B are a schematic front view and a schematic top view of a state in which the shear adhesion strength test was performed. For example, an end, of the glass plate S11, on a side opposite to an end bonded to the plastic plate S20 was held by a fixed part 51, and an end, of the plastic plate S20, on a side opposite to an end bonded to the glass plate S11 was held by a movable part 52. In this state, rupture strength was measured when the movable part 52 was pulled at a shear rate of 200 mm/min. Rupture occurred in about several seconds from start of the measurement, and the measurement was ended when each sample ruptured. Note that the bonding agent S40 was made to have a planar shape of a 25 mm×25 mm square and a thickness of 0.8 mm. Each of the following was used as the bonding agent S40: a pressure-sensitive adhesive mainly containing synthetic rubber (an experimental example 1); a pressure-sensitive adhesive mainly containing acrylic (an experimental example 2); another pressure-sensitive adhesive mainly containing synthetic rubber (an experimental example 3); an adhesive mainly containing polyolefin (an experimental example 4); a double-sided tape (an experimental example 5); an adhesive mainly containing polyurethane (an experimental example 6); and an adhesive mainly containing two-part modified silicone (an experimental example 7). Table 1 presents average strength and curing time of each of the experimental examples 1 to 7.

TABLE 1

|  | Category | Main constituent | Average strength [MPa] | Curing time |
| --- | --- | --- | --- | --- |
| Experimental example 1 | pressure-sensitive adhesive | synthetic rubber | 0.57 | 10 seconds or less |
| Experimental example 2 | pressure-sensitive adhesive | acrylic | 2.09 | 10 seconds or less |
| Experimental example 3 | pressure-sensitive adhesive | synthetic rubber | 1.08 | 10 seconds or less |
| Experimental example 4 | adhesive | polyolefin | 3.16 | 10 seconds or less |
| Experimental example 5 | double-sided tape | — | 0.57 | instantaneous |
| Experimental example 6 | adhesive | polyurethane | 6.75 | 168 hours |
| Experimental example 7 | adhesive | two-part modified silicone | 6.29 | 24 hours |

As presented in Table 1, it was found that the pressure-sensitive adhesives or adhesives of the experimental examples 1 to 4 and 6 to 7 make it possible to achieve bonding strength equivalent to or greater than that of the double-sided tape of the experimental example 5. It was also confirmed that it is possible to apply the pressure-sensitive adhesives or adhesive of the experimental examples 1 to 4 as the second bonding agent according to at least one embodiment of the technology, and to apply the adhesives of the experimental examples 6 and 7 as the first bonding agent according to at least one embodiment of the technology. In other words, any of the adhesives of the experimental examples 6 and 7 with higher average strength may be used as the first bonding agent, and any of the hot-melt pressure-sensitive adhesives or adhesive of the experimental examples 1 to 4 with very short curing time may be used as the second bonding agent. It was confirmed that this makes it possible to provide a module (e.g., the glass module 1) that makes it possible to improve production efficiency in the whole manufacturing process while ensuring reliability in terms of quality. For example, in a case where only any of the adhesives of the experimental examples 6 and 7 is used, relative positional deviation occurs between the first member (e.g., the glass member 10) and the second member (e.g., the bracket 20) before elapse of the curing time of 168 hours or 24 hours, for example. In contrast, it was confirmed that using the first bonding agent and the second bonding agent in combination, as in at least one embodiment of the technology, makes it possible to shorten a period before shipping, without impairing accuracy of the relative position between the first member and the second member. Note that, as presented in Table 1, bonding strength per unit area exhibited by the hot-melt pressure-sensitive adhesives or adhesive of the experimental examples 1 to 4 serving as the second bonding agent was about ½ to about ⅕ of bonding strength per unit area exhibited by the adhesives of the experimental examples 6 and 7 serving as the first bonding agent. Accordingly, to make the overall bonding strength achieved by the second bonding agent equivalent to the overall bonding strength achieved by the first bonding agent, an area coated with the second bonding agent may be made about twice to about five times as large as an area coated with the first bonding agent. In other words, a ratio of the area coated with the second bonding agent with respect to the area coated with the first bonding agent may be made equal to or greater than a ratio of the bonding strength of the first bonding agent per unit area with respect to the bonding strength of the second bonding agent per unit area. It was also found that the double-sided tape (experimental example 5) may be unnecessary in at least one embodiment of the technology, which makes it possible to reduce cost of an operation of bonding the double-sided tape and cost of the double-sided tape.

6. OTHER MODIFICATION EXAMPLES

Although the technology has been described with reference to the example embodiments, the technology may be modified in a variety of ways, without being limited to the foregoing embodiments. For example, although the foregoing example embodiments and modification examples describe an automotive front windshield as an example of the first member, the first member according to at least one embodiment of the technology is not limited thereto and may be an automotive rear windshield, for example. The first member may be a metallic member or a resin member, without being limited to the glass member. Although the foregoing example embodiments and modification examples describe, as an example of the second member, a camera bracket for mounting of a camera on the glass member serving as the first member, the technology is not limited thereto. For example, the second member according to at least one embodiment of the technology may be a bracket for mounting, on the first member, of a radar, a laser imaging detection and ranging (LiDAR), or a sonar, in place of the camera.

Figure 9A:
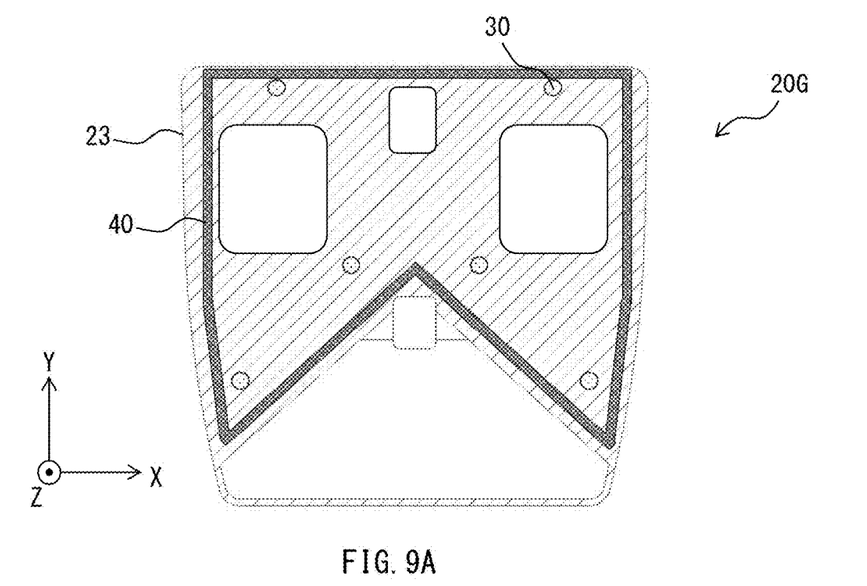
FIG. 9A is a plan view of an example overall configuration of a bracket according to a sixth modification example.
Figure 9B:
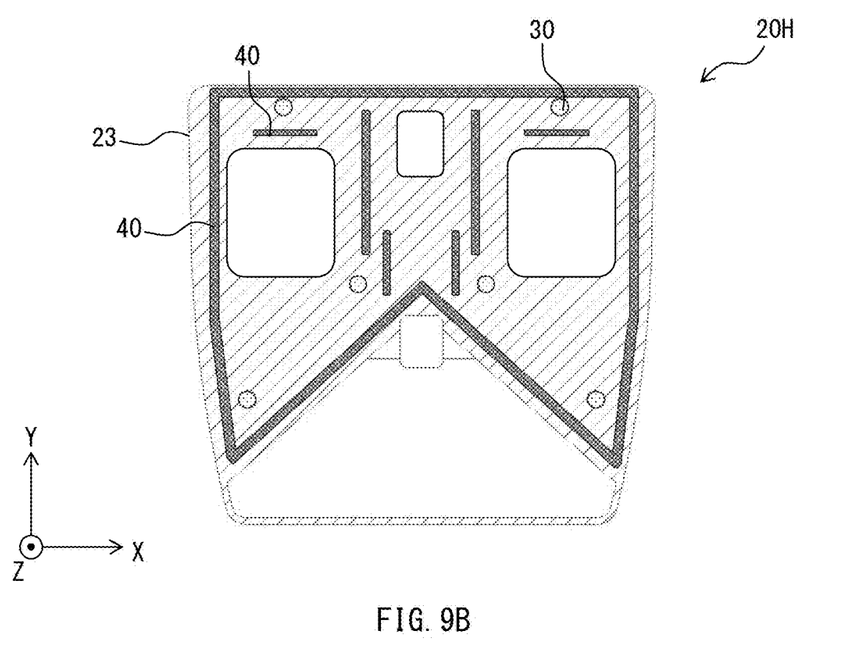
FIG. 9B is a plan view of an example overall configuration of a bracket according to a seventh modification example.

A place where the second bonding agent is provided may be modified in a variety of ways, without being limited to the places described in the foregoing example embodiments and modification examples. For example, the second bonding agent 40 may be applied along the outer edge 23, as with a bracket 20G according to a sixth modification example illustrated in FIG. 9A and a bracket 20H according to a seventh modification example illustrated in FIG. 9B.

It is possible to achieve at least the following configurations from the foregoing example embodiments of the technology.

(1) A module including:
  a first member having a first surface;
  a second member having a second surface opposed to the first surface;
  a first bonding agent provided in a first region on the second surface, and bonding the second member to the first surface with first bonding strength that allows the second member to be retained on the first surface; and
  a second bonding agent provided in a second region on the second surface, and bonding the second member to the first surface with second bonding strength that allows the second member to be retained on the first surface,
  in which second curing time taken before the second bonding agent exhibits the second bonding strength by being cured in a predetermined atmosphere is shorter than first curing time taken before the first bonding agent exhibits the first bonding strength by being cured in the predetermined atmosphere.

(2) The module according to (1), in which the first member includes a glass member mainly containing glass.

(3) The module according to (1) or (2), in which the second member includes a resin member mainly containing a resin or a metallic member mainly containing a metal.

(4) The module according to any one of (1) to (3), in which the first bonding agent and the second bonding agent each include an adhesive.

(5) The module according to any one of (1) to (3), in which the first bonding agent includes an adhesive, and the second bonding agent includes a pressure-sensitive adhesive.

(6) The module according to any one of (1) to (5), in which a first retaining period during which the first bonding agent is able to retain the second member on the first surface is longer than a second retaining period during which the second bonding agent is able to retain the second member on the first surface.

(7) The module according to any one of (1) to (6), in which the first bonding agent has chemical resistance and thermal resistance respectively higher than chemical resistance and thermal resistance of the second bonding agent.

(8) The module according to any one of (1) to (7), in which
the second member includes a plate-shaped member having a surface and an edge, the surface serving as the second surface, and
the surface of the plate-shaped member has a first groove provided in the second region.

(9) The module according to (8), in which the surface has a second groove provided between the first groove and the first region provided with the first bonding agent.

(10) The module according to any one of (1) to (7), in which
the second member includes a plate-shaped member having a surface and an edge, the surface serving as the second surface,
the second region is provided with a pair of walls standing on the surface and opposed to each other, and
the second bonding agent is provided between the pair of walls.

(11) The module according to any one of (1) to (10), in which the first bonding agent includes an adhesive including at least one of epoxy resin, polyurethane resin, or modified silicone resin.

(12) The module according to any one of (1) to (11), in which the second bonding agent includes a pressure-sensitive adhesive including at least one of synthetic rubber or acrylic, or an adhesive including polyolefin.

(13) The module according to any one of (1) to (11), in which a ratio of an area coated with the second bonding agent with respect to an area coated with the first bonding agent is equal to or greater than a ratio of the first bonding strength per unit area with respect to the second bonding strength per unit area.

(14) A method of manufacturing a module, the method including:
preparing a first member having a first surface;
preparing a second member having a second surface;
providing a first bonding agent in a first region on the second surface;
providing a second bonding agent in a second region on the second surface; and
bonding together the first member and the second member to sandwich the first bonding agent and the second bonding agent between the first surface and the second surface, in which the first bonding agent is configured to bond the second member to the first surface with first bonding strength and take first curing time before exhibiting the first bonding strength by being cured in a predetermined atmosphere, the first bonding strength allowing the second member to be retained on the first surface, and
the second bonding agent is configured to bond the second member to the first surface with second bonding strength and take second curing time before exhibiting the second bonding strength by being cured in the predetermined atmosphere, the second bonding strength allowing the second member to be retained on the first surface, the second curing time being shorter than the first curing time.

The module and the method of manufacturing the same according to at least one example embodiment of the technology makes it possible to bond together the first member and the second member more efficiently with higher accuracy.

It is to be noted that effects of the example embodiments and modification examples of the technology should not be limited to those described hereinabove, and may be any effect described herein.

Although the technology is described hereinabove in terms of example embodiments and modification examples, it is not limited thereto. It should be appreciated that variations may be made in the described example embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this technology, the use of the terms first, second, etc. do not denote any order or importance, but rather the terms first, second, etc. are used to distinguish one element from another. The term "disposed on/provided on/formed on" and its variants as used herein refer to elements disposed directly in contact with each other or indirectly by having intervening structures therebetween. Moreover, no element or component in this technology is intended to be dedicated to the public regardless of whether the element or component is explicitly recited in the following claims.

What is claimed is:

1. A module comprising:
a first member having a first surface;
a second member having a second surface opposed to the first surface;
a first bonding agent provided in a first region on the second surface, and bonding the second member to the first surface with first bonding strength that allows the second member to be retained on the first surface; and
a second bonding agent provided in a second region on the second surface, and bonding the second member to the first surface with second bonding strength that allows the second member to be retained on the first surface,
wherein the second member comprises a plate-shaped member having a surface and an edge, the surface serving as the second surface,
the surface of the plate-shaped member has a first groove provided in the second region,
the first bonding agent comprises an adhesive including at least one of epoxy resin, polyurethane resin, or modified silicone resin, the second bonding agent comprises a pressure-sensitive adhesive including at least one of synthetic rubber or acrylic, or an adhesive including polyolefin, and the second bonding agent is provided along an extending direction of the first groove.

2. The module according to claim 1, wherein the first member comprises a glass member.

3. The module according to claim 1, wherein the second member comprises a resin member or a metallic member.

4. The module according to claim 1, wherein the first bonding agent has chemical resistance and thermal resistance respectively higher than chemical resistance and thermal resistance of the second bonding agent.

5. The module according to claim 1, wherein the surface of the plate-shaped member has a second groove provided between the first groove and the first region provided with the first bonding agent.

6. The module according to claim 1, wherein a ratio of an area coated with the second bonding agent with respect to an area coated with the first bonding agent is equal to or greater than a ratio of the first bonding strength per unit area with respect to the second bonding strength per unit area.

* * * * *